United States Patent
Yamamoto

(10) Patent No.: US 12,531,645 B2
(45) Date of Patent: Jan. 20, 2026

(54) COMMUNICATION APPARATUS HAVING LEADER AND FOLLOWER ROLES, METHOD FOR CONTROLLING COMMUNICATION APPARATUS, AND STORAGE MEDIUM

(71) Applicant: CANON KABUSHIKI KAISHA, Tokyo (JP)

(72) Inventor: Tetsuya Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 18/313,542

(22) Filed: May 8, 2023

(65) Prior Publication Data

US 2023/0370187 A1 Nov. 16, 2023

(30) Foreign Application Priority Data

May 13, 2022 (JP) .................. 2022-079249

(51) Int. Cl.
*H04J 3/06* (2006.01)
*H04N 23/661* (2023.01)
*H04W 4/12* (2009.01)

(52) U.S. Cl.
CPC ......... *H04J 3/0673* (2013.01); *H04N 23/662* (2023.01); *H04W 4/12* (2013.01)

(58) Field of Classification Search
CPC ....... H04J 3/0673; H04N 23/662; H04W 4/12
See application file for complete search history.

(56) References Cited

U.S. PATENT DOCUMENTS

2010/0005166 A1* 1/2010 Chung .................. H04L 69/323
709/224
2012/0136956 A1* 5/2012 Khoury ................. H04J 3/0667
709/248

FOREIGN PATENT DOCUMENTS

| CN | 102904705 A | * | 1/2013 | |
|---|---|---|---|---|
| CN | 114616772 A | * | 6/2022 | ............ H04J 3/0679 |
| GB | 2595881 A | * | 12/2021 | ........ H04W 56/0055 |
| JP | 2013085278 A | | 5/2013 | |
| JP | 2013538022 A | | 8/2013 | |
| WO | WO-2021107240 A1 | * | 6/2021 | ............ H04J 3/0679 |

* cited by examiner

*Primary Examiner* — Samina F Choudhry
(74) *Attorney, Agent, or Firm* — Canon U.S.A., Inc. IP Division

(57) ABSTRACT

A communication apparatus includes at least a processor and at least a memory. The at least memory contains instructions that, when executed by the at least processor, cause the at least processor to perform operations comprising performing a determination process and performing a setting process. The determination process determines whether the communication apparatus operates as a leader apparatus in communication or operates as a follower apparatus in the communication. The setting process, based on a result of the determination process, sets the communication apparatus to be a time master apparatus that is a provider of a reference clock for implementing time synchronization with one or more other communication apparatuses or to be a time slave apparatus that adjusts time in accordance with the reference clock.

12 Claims, 8 Drawing Sheets

FIG.5

| FIELD | OCTET NUMBER |
| --- | --- |
| Header | 34 |
| originTimestamp | 10 |
| currentUtcOffset | 2 |
| Reserved | 1 |
| Priority1 | 1 |
| ClockQuality | 4 |
| Priority2 | 1 |
| Identity | 8 |
| stepsRemoved | 2 |
| timeSource | 1 |

FIG.8

| FIELD | OCTET NUMBER |
|---|---|
| Header | 34 |
| targetPortIdentity | 10 |
| startingBoundaryHops | 1 |
| boundaryHops | 1 |
| Reserved \| actionField | 1 |
| Reserved | 1 |
| managementTLV | (VARIABLE) |

COMMUNICATION APPARATUS HAVING LEADER AND FOLLOWER ROLES, METHOD FOR CONTROLLING COMMUNICATION APPARATUS, AND STORAGE MEDIUM

BACKGROUND

Technical Field

One disclosed aspect of the embodiments relates to a communication apparatus, a method for controlling the communication apparatus, and a storage medium.

Description of the Related Art

There is known Precision Time Protocol (PTP) as a protocol for implementing time synchronization among apparatuses connected to a network. The PTP is defined by Institute of Electrical and Electronics Engineers (IEEE) 1588 standard. Under the PTP, an apparatus operating as a leader and an apparatus operating as a follower can periodically exchange messages for time synchronization (i.e., packets) to implement the time synchronization between the apparatuses and correct the time of the apparatus operating as the follower. Note that, in the foregoing description, an apparatus that operates as a host device in control is referred to as "leader", and an apparatus that operates as a controlled apparatus under the control of the host apparatus is referred to as "follower". In the IEEE 1588 standard, on the other hand, the apparatus operating as the leader for time synchronization is referred to as "PTP master" or "PTP time transmitter", and the apparatus operating as the follower for time synchronization is referred to as "PTP slave" or "PTP time receiver". Further, in the IEEE 1588 standard, the apparatus that operates as the host device in control is referred to as "master", and the apparatus that operates as the controlled apparatus under the control of the host apparatus is referred to as "slave". In the following description, the terms defined in the IEEE 1588 standard will be used so as to clarify the correspondence between the disclosure and the IEEE 1588 standard.

The standard also defines Best Leader Clock Algorithm (BMCA) as an algorithm for automatically determining an optimum PTP master (grand master) from among a plurality of PTP master candidates. Japanese Patent Application Laid-Open No. 2013-85278 discusses a technique by which a plurality of PTP master candidates periodically exchanges Announce messages using BMCA to determine the PTP master in accordance with the content included in the messages.

Japanese Unexamined Patent Application Publication (Translation of PCT Application) No. 2013-538022 discusses a technique for preventing an error in the time synchronization among a plurality of nodes including an intermediate node. Specifically, Japanese Unexamined Patent Application Publication (Translation of PCT Application) No. 2013-538022 discusses that an error in time synchronization is prevented in a communication network formed by a plurality of nodes including the PTP master and a plurality of PTP slaves by using a transparent clock (TC) or a boundary clock (BC) for the intermediate node.

SUMMARY

As an aspect of the disclosure, a communication apparatus includes the following configuration as a means of achieving at least one of the objectives described above. The communication apparatus includes at least a processor and at least a memory. The at least memory contains instructions that, when executed by the at least processor, cause the at least processor to perform operations including performing a determination process and performing a setting process. The determination process determines whether the communication apparatus operates as a leader apparatus in communication or operates as a follower apparatus in the communication. The setting process, based on a result of the determination process, sets the communication apparatus to be a time master apparatus that is a provider of a reference clock for implementing time synchronization with one or more other communication apparatuses or to be a time slave apparatus that adjusts time in accordance with the reference clock.

Further features of the disclosure will become apparent from the following description of exemplary embodiments with reference to the attached drawings.

BRIEF DESCRIPTION OF THE DRAWINGS

FIG. 5 illustrates an example of a format of an Announce message.

FIG. 8 illustrates an example of a format of a Management message.

DESCRIPTION OF THE EMBODIMENTS

Figure 1:
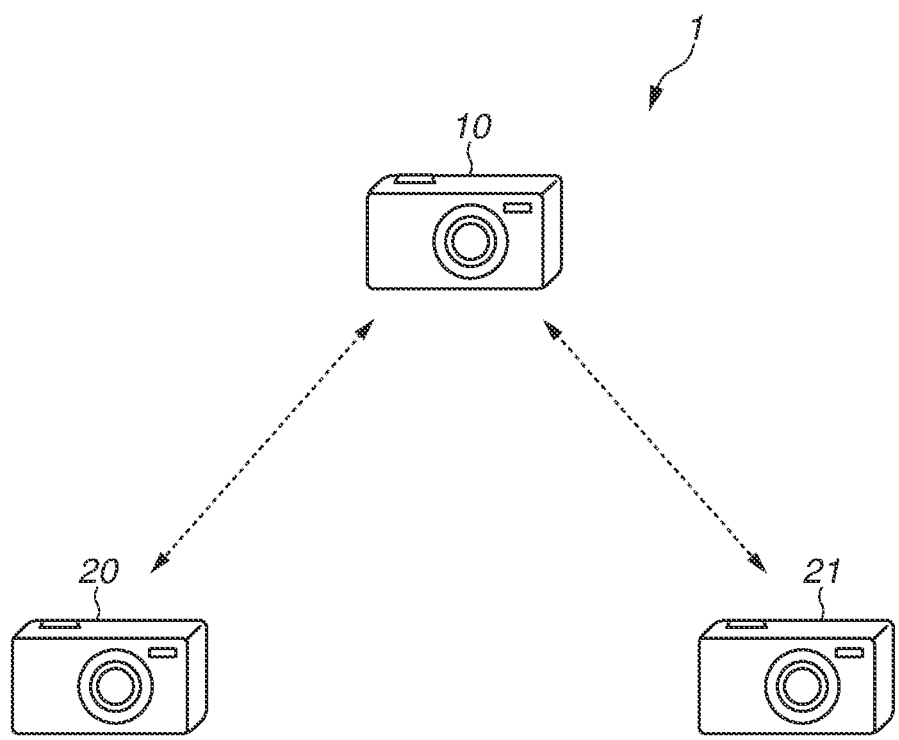
FIG. 1 illustrates an example of a configuration of a communication network.

Hereinafter, exemplary embodiments for carrying out the disclosure will be described in detail with reference to the accompanying drawings. The exemplary embodiments described below are merely examples of means of achieving the disclosure, and should be corrected or changed as appropriate depending on the configuration of an apparatus to which the disclosure is applied and various conditions. The disclosure is not limited to the following exemplary embodiments. In addition, not all the combinations of features of the exemplary embodiments are necessarily essential for the solution of the disclosure. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

In a first exemplary embodiment described below, Best Master Clock Algorithm (BMCA) is applied in a communication network formed by one leader apparatus (leader apparatus of communications such as base station) and a plurality of follower apparatuses (follower apparatus of the communications such as terminal station).

The case where a follower apparatus serves as a Precision Time Protocol (PTP) master will be discussed. In this case, the communication between the follower apparatus serving as the PTP master and other follower apparatuses (PTP slaves) different from the PTP master is performed using a plurality of nodes such as a follower apparatus, the leader apparatus and another follower apparatus. This may increase an error in time synchronization between the follower apparatus serving as the PTP master and the other follower apparatuses serving as the PTP slaves. The occurrence of such a time synchronization error is not desired because, in the case of synchronized image capturing using a plurality of nodes, for example, the error may cause a difference in the timing of image capturing among the nodes.

On the other hand, the occurrence of a time synchronization error can be prevented by employing a configuration using the transparent clock (TC) or the boundary clock (BC) described above. However, the use of such a configuration can lead to complexity of an apparatus configuration. The complexity increases the design cost and manufacturing cost of the apparatus. Thus, from the aspect of cost, it is not desired to use the configuration described above to increase the accuracy of time synchronization among a small number of apparatuses.

In view of this, the present exemplary embodiment provides a mechanism for preventing an increase in time synchronization error without complicating the configuration of an apparatus. The mechanism according to the present exemplary embodiment will be specifically described below with reference to the drawings.

Network Configuration

FIG. 1 illustrates an example of a configuration of a communication network according to the present exemplary embodiment. A communication network 1 according to the present exemplary embodiment is formed by three communication apparatuses. A communication apparatus 10 functions (operates) as a leader apparatus in wireless communication, and communication apparatuses 20 and 21 function as follower apparatuses in the wireless communication. The communication apparatuses 20 and 21 (follower apparatuses) can communicate with each other via the communication apparatus 10 (leader apparatus). For example, the communication apparatus 10 operates as an access point to a wireless local area network (LAN), and the communication apparatuses 20 and 21 operate as stations on the wireless LAN. That is, on a wireless LAN, the communication apparatuses 10, 20, and 21 operate in an infrastructure mode.

In the present exemplary embodiment, the communication apparatuses 10, 20, and 21 are assumed to be apparatuses with an imaging function (for example, cameras), but are not limited to this. In the present exemplary embodiment, the communication apparatuses 10, 20, and 21 are configured to operate in a plurality of operation modes. In the present exemplary embodiment, the communication apparatuses 10, 20, and 21 are configured to operate in at least two operation modes: a synchronized operation mode in which the plurality of communication apparatuses performs a predetermined process and operation (for example, an imaging process) in a synchronized manner; and a time synchronous mode in which the plurality of apparatuses implements time synchronization. The time synchronization is performed in accordance with the PTP on the basis of global positioning system (GPS), for example.

The configuration illustrated in FIG. 1 is an example, and the communication network 1 may include other communication apparatuses configured similarly to the communication apparatuses 10, 20, and 21, for example. The communication method used is not limited to a wireless LAN. The communication network 1 may be configured to use another communication method as long as the communication network 1 is formed by a leader apparatus and follower apparatuses that perform wireless communication.

Configuration of Communication Apparatus

Figure 2:
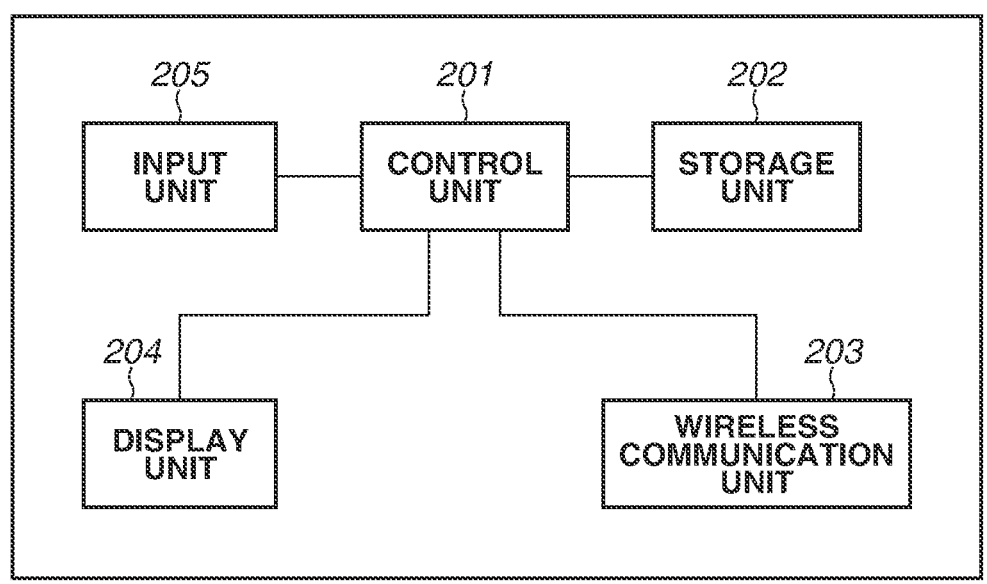
FIG. 2 illustrates an example of a hardware configuration of a communication apparatus according to a first exemplary embodiment.

FIG. 2 illustrates an example of a hardware configuration of a communication apparatus according to the present exemplary embodiment. Hereinafter, the hardware configuration of the communication apparatus 10 will be described as an example, but the communication apparatuses 20 and 21 can have hardware configurations similar to that of the communication apparatus 10. The communication apparatus 10 includes, as an example of a hardware configuration, a control unit or circuit 201, a storage unit or circuit 202, a wireless communication unit or circuit 203, a display unit or circuit 204, and an input unit or circuit 205.

The control unit 201 controls the entire communication apparatus 10 by executing a control program (computer program) stored in the storage unit 202. The control unit 201 may be a programmable device or a processor configured to execute instructions or control program. It may be a microprocessor, a signal processor, or any circuit or device that can execute instructions or programs. The storage unit 202 stores the control program executed by the control unit 201 and various kinds of information such as communication parameters, captured image data, and authentication information. The various operations described below are performed when the control unit 201 executes the control program stored in the storage unit 202. These operations may correspond to the units described in the following. The wireless communication unit 203 performs control to perform wireless communication. For example, the wireless communication unit 203 controls an antenna (not illustrated) to transmit and receive signals. The display unit 204 has a function of outputting visual information. For example, the display unit 204 is a liquid crystal display (LCD) or a light emitting diode (LED) display. The display unit 204 may also be configured to output sound information. The input unit 205 is used by the user to input various kinds of data and acquire sensor information. The display unit 204 and the input unit 205 may be configured as a common module and function as a graphic user interface (GUI).

Figure 3:
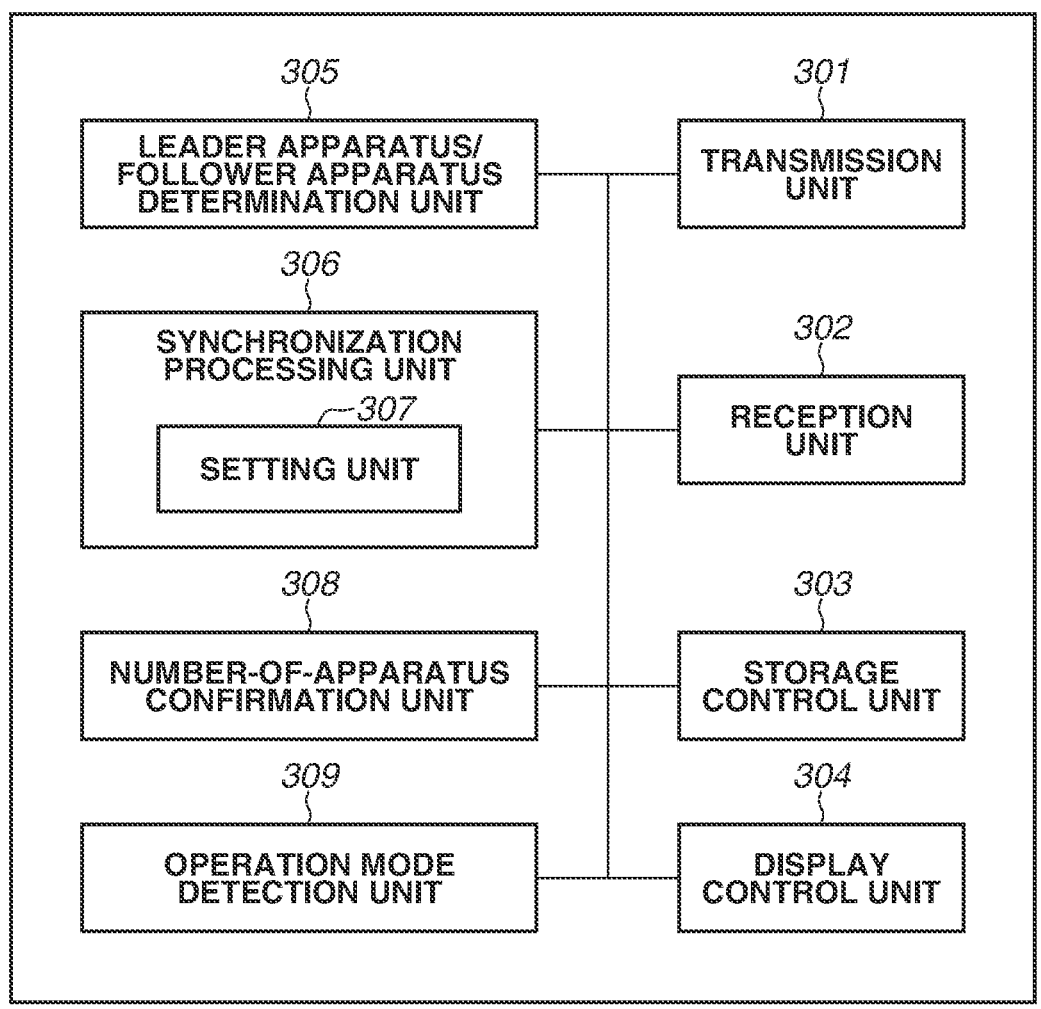
FIG. 3 illustrates an example of a functional configuration of the communication apparatus according to the first exemplary embodiment.

FIG. 3 illustrates a functional configuration (software functions) of a communication apparatus according to the present exemplary embodiment. Hereinafter, the functional configuration of the communication apparatus 10 will be described as an example. However, the communication apparatuses 20 and 21 can have functional configurations similar to that of the communication apparatus 10. The communication apparatus 10 includes, as an example of a functional configuration, a transmission unit or circuit 301, a reception unit or circuit 302, a storage control unit or circuit 303, a display control unit or circuit 304, a leader apparatus/follower apparatus determination unit or circuit 305, a synchronization processing unit or circuit 306, a number-of-apparatus confirmation unit or circuit 308, and an operation mode detection unit or circuit 309. The synchronization processing unit 306 includes a setting unit or circuit 307.

The transmission unit 301 performs a process of transmitting signals to another communication apparatus via the wireless communication unit 203. The reception unit 302 performs a process of receiving signals from another communication apparatus via the wireless communication unit 203. For example, the transmission unit 301 performs a process of transmitting wireless LAN signals to another communication apparatus and the reception unit 302 performs a process of receiving wireless LAN signals from another communication apparatus in conformity with the Institute of Electrical and Electronics Engineers (IEEE) 802.11a/b/g/n/ac/ax standards. The storage control unit 303 controls the storage unit 202. The display control unit 304 performs control of display on the display unit 204 (for example, a process of controlling a screen displayed on the display unit 204).

The leader apparatus/follower apparatus determination unit 305 determines whether the communication apparatus 10 itself currently operates as a leader apparatus or operates as a follower apparatus in the wireless communication. The leader apparatus/follower apparatus determination unit 305 can determine whether the communication apparatus 10 operates as the leader apparatus or a follower apparatus, based on the signals transmitted and received via the transmission unit 301 and the reception unit 302 to establish communication, for example.

The synchronization processing unit 306 performs a time synchronization process via the transmission unit 301 and the reception unit 302 in accordance with the PTP. The synchronization processing unit 306 also determines a PTP master (time master) that is the provider of a reference clock for time synchronization with other communication apparatuses in accordance with the BMCA. The PTP master is determined based on Announce messages (Announce packets) exchanged among the communication apparatuses. FIG. 5 illustrates an example of a format of an Announce message. In the Announce message illustrated in FIG. 5, the value of a "Priority1" field indicating priority (hereinafter, Priority1 value) can be set by the user in a range of 0 to 255. Among a plurality of communication apparatuses that are PTP master candidates, the synchronization processing unit 306 can determine the communication apparatus with the smallest Priority1 value as the PTP master on a top priority basis. Specifically, the synchronization processing unit 306 transmits an Announce message including the Priority1 value set to the communication apparatus 10 (its own Announce message) over the network. Then, upon receipt of another Announce message including a Priority1 value smaller than the foregoing Priority1 value, the synchronization processing unit 306 stops transmitting its own Announce message. A communication apparatus that is continuing to transmit an Announce message can be eventually determined as the PTP master.

The synchronization processing unit 306 includes the setting unit 307 that makes a setting for the communication apparatus 10 to be the PTP master (time master) or a PTP slave (time slave) adjusting time in accordance with the reference clock provided by the PTP master. In the present exemplary embodiment, the setting unit 307 is configured to set (adjust) the Prioriy1 value of the Announce message illustrated in FIG. 5. The setting is made in response to a user operation via the input unit 205.

The number-of-apparatus confirmation unit 308 confirms the current number of the communication apparatuses forming the communication network 1. In the example of the communication network 1 illustrated in FIG. 1, the number-of-apparatus confirmation unit 308 confirms that the number of the communication apparatuses is three. The number-of-apparatus confirmation unit 308 is also configured to confirm whether another communication apparatus operating as a follower apparatus has been newly connected to the communication network 1.

The operation mode detection unit 309 detects the operation mode of the communication apparatus 10. As described above, in the present exemplary embodiment, the communication apparatus 10 is configured to operate in at least two operation modes: a synchronized operation mode in which a plurality of communication apparatuses performs a predetermined process in a synchronized state; and a time synchronization mode in which a plurality of apparatuses implements time synchronization. The operation mode of the communication apparatus 10 can be set in response to an instruction from another apparatus via the reception unit 302. Alternatively, the operation mode of the communication apparatus 10 may be set by the user via the input unit 205 on the setting screen of the display unit 204 displayed by the display control unit 304.

Flow of Processing

Figure 4:
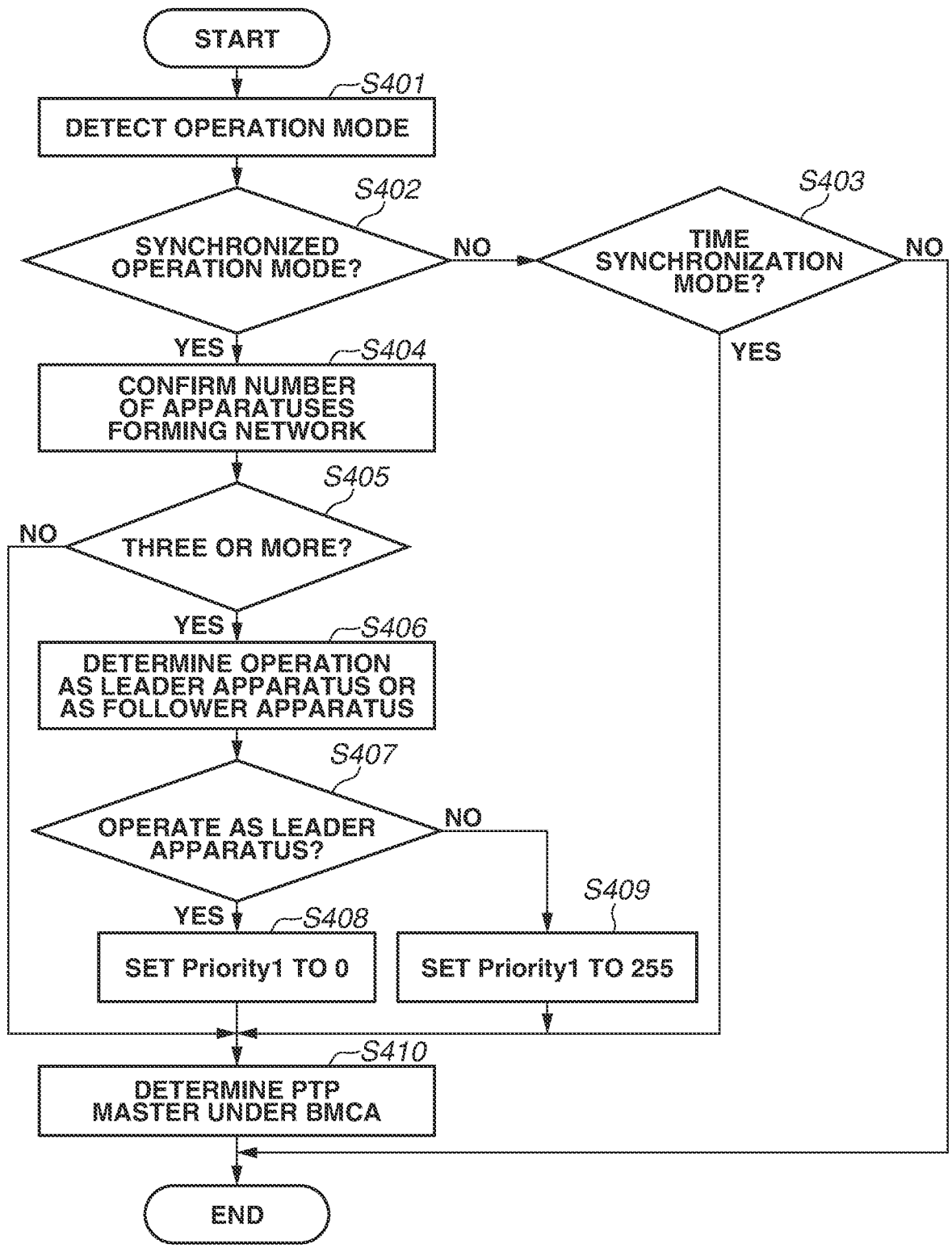
FIG. 4 illustrates an example of a flowchart of a process executed by the communication apparatuses according to the first exemplary embodiment.

Subsequently, a process of determining the PTP master in the present exemplary embodiment will be described with reference to FIG. 4. FIG. 4 is a flowchart of the process executed by the communication apparatuses (the communication apparatuses 10, 20, and 21 in the network configuration illustrated in FIG. 1) according to the present exemplary embodiment. The process can be started by the control units 201 of the respective communication apparatuses when the communication apparatuses establish the communication network 1 or participate in the communication network 1. The process may be started by the control units 201 of the existing communication apparatuses and a new communication apparatus when it is detected that the new communication apparatus has participated in the communication network 1. The process can be performed by each of the control units 201 executing a computer program read by the storage control unit 303 from the storage unit 202.

First, in operation S401, the operation mode detection unit 309 of each communication apparatus detects the operation mode of the communication apparatus. In operation S402, the operation mode detection unit 309 determines whether the operation mode is the synchronized operation mode. If the operation mode is the synchronized operation mode (YES in operation S402), the process proceeds to operation S404. In a case where the operation mode is not the synchronized operation mode (NO in operation S402), the process proceeds to operation S403. In operation S403, the operation mode detection unit 309 determines whether the operation mode of the communication apparatus is the time synchronization mode. If the operation mode is the time synchronization mode (YES in operation S403), the process proceeds to operation S410. In a case where the operation mode is not the time synchronization mode (NO in operation S403), the control unit 201 determines that no time synchronization in accordance with the PTP is necessary, and the process is ended. In operation S410, the synchronization processing unit 306 determines the optimum PTP master in accordance with the BMCA. Accordingly, if the operation mode is the time synchronization mode, the synchronization processing unit 306 operates in accordance with the normal BMCA to determine the optimum PTP master.

In operation S404, the number-of-apparatus confirmation unit 308 confirms the number of communication apparatuses forming the communication network 1. In operation S405, the number-of-apparatus confirmation unit 308 determines whether the number of communication apparatuses is three or more. If the number of communication apparatuses is less than three (NO in operation S405), the process proceeds to operation S410. Then in operation S410, the synchronization processing unit 306 determines the optimum PTP master in accordance with the BMCA. In this manner, if the number of the communication apparatuses forming the communication network 1 is less than three, the optimum PTP master is determined in accordance with the normal BMCA.

If the number of the communication apparatuses forming the communication network 1 is three or more (YES in operation S405), then in operation S406, the leader apparatus/follower apparatus determination unit 305 determines whether the communication apparatus itself operates as the leader apparatus or operates as a follower apparatus. In operation S407, the leader apparatus/follower apparatus determination unit 305 determines whether the communication apparatus itself operates as the leader apparatus. If the leader apparatus/follower apparatus determination unit 305 determines that the communication apparatus operates as the leader apparatus (YES in operation S407), the process proceeds to operation S408. If the leader apparatus/follower apparatus determination unit 305 determines that the communication apparatus operates as a follower apparatus (NO in operation S407), the process proceeds to operation S409.

In operation S408, the setting unit 307 sets the Priority1 value in the Announce message to be transmitted by the transmission unit 301 to the communication apparatus to 0. In operation S409, the setting unit 307 sets the Priority1 value to 255. Then, in operation S410, the synchronization processing unit 306 determines the PTP master in accordance with the BMCA. Accordingly, the communication apparatus operating as the leader apparatus is determined as the PTP master, whereas the communication apparatuses operating as follower apparatuses are not determined as the PTP master.

Referring to FIG. 4, if the number of the communication apparatuses constituting the network is three or more (YES in operation S405), the process proceeds to operation S406. Instead of this, if the number is two or more, the process may proceed to operation S406. In addition, in the process of FIG. 4, the determination on the operation mode (the determination regarding whether the operation mode is the synchronized operation mode in operation S402 or the determination regarding whether the operation mode is the time synchronization mode in operation S403) needs not necessarily be performed. In this case, the process may proceed to operation S404 regardless of the operation mode.

As described above, each of the communication apparatuses according to the present exemplary embodiment sets the Priority1 value in the Announce message to be transmitted to 0 such that, if the communication apparatus operates as the leader apparatus, the communication apparatus is determined as the PTP master. With the foregoing configuration, even if each of the plurality of communication apparatuses does not have a complicated configuration, the communication apparatus operating as the leader apparatus is set to be the PTP master, which makes it possible to prevent an increase in time synchronization error in the communication network.

In a second exemplary embodiment, a leader apparatus in wireless communication sets the value of Priority1 in an Announce message to be transmitted by a follower apparatus. The configuration of a communication network and the configuration of each communication apparatus in the present exemplary embodiment are similar to those illustrated in FIGS. 1 to 3 described above in the first exemplary embodiment. Hereinafter, the differences from the first exemplary embodiment will be described.

Flow of Processing

Figure 6:
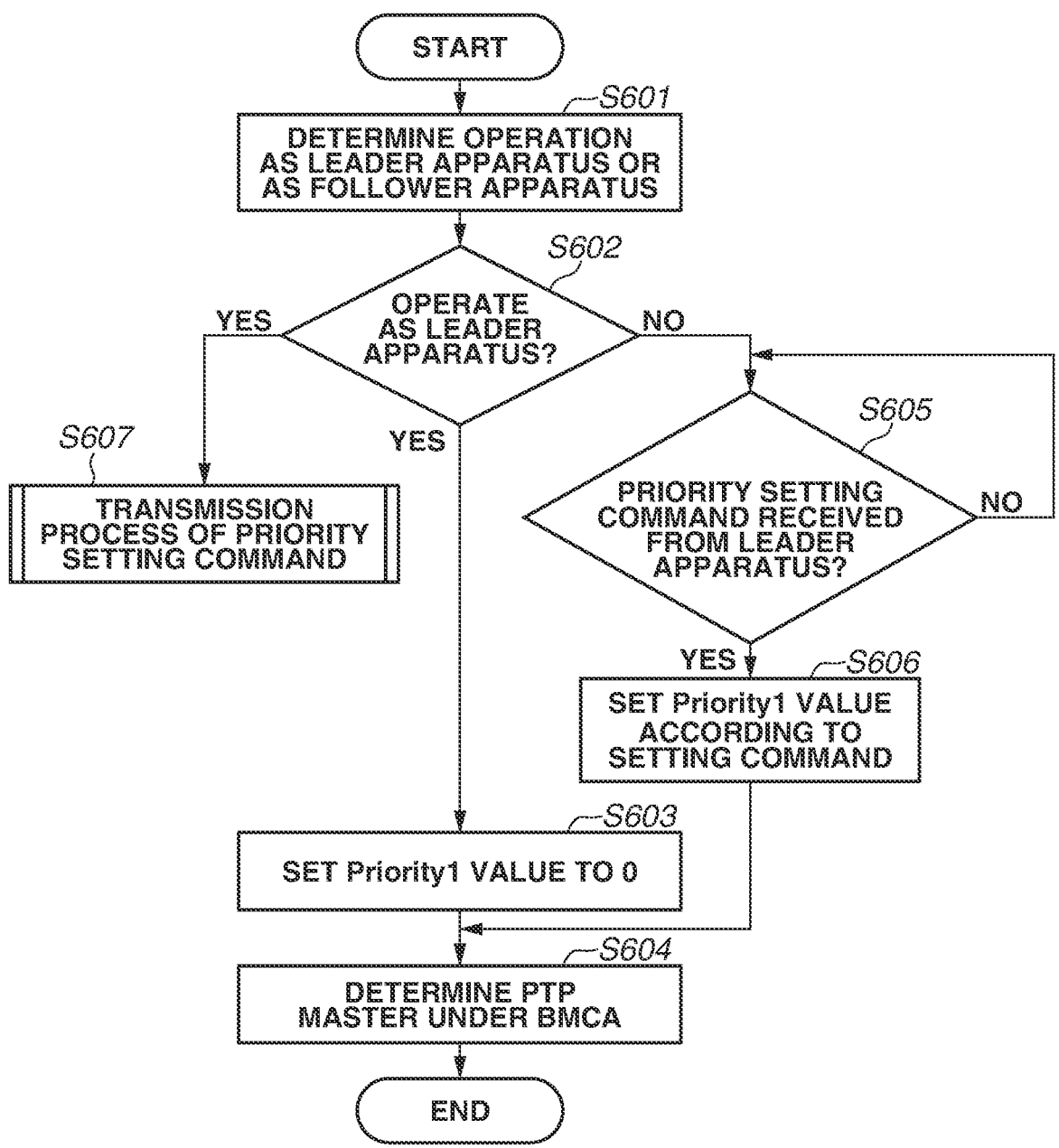
FIG. 6 illustrates an example of a flowchart of a process executed by a communication apparatus according to a second exemplary embodiment.

A process of determining a PTP master in the present exemplary embodiment will be described with reference to FIG. 6. FIG. 6 is a flowchart of the process executed by each of the communication apparatuses (communication apparatus 10, 20, and 21 in the network configuration illustrated in FIG. 1) according to the present exemplary embodiment. After the start of the process in FIG. 6, in operation S601, a leader apparatus/follower apparatus determination unit 305 of each communication apparatus confirms whether the communication apparatus itself operates as the leader apparatus or operates as a follower apparatus. In operation S602, the leader apparatus/follower apparatus determination unit 305 determines whether the communication apparatus operates as the leader apparatus. If the leader apparatus/follower apparatus determination unit 305 determines that the communication apparatus operates as the leader apparatus (YES in operation S602), the process proceeds to operation S603. If the leader apparatus/follower apparatus determination unit 305 determines that the communication apparatus operates as a follower apparatus (NO in operation S602), the process proceeds to operation S605. If it is determined that the communication apparatus operates as the leader apparatus (YES in operation S602), then in operation S607, the communication apparatus performs a process of transmitting a priority setting command in parallel.

Figure 7:
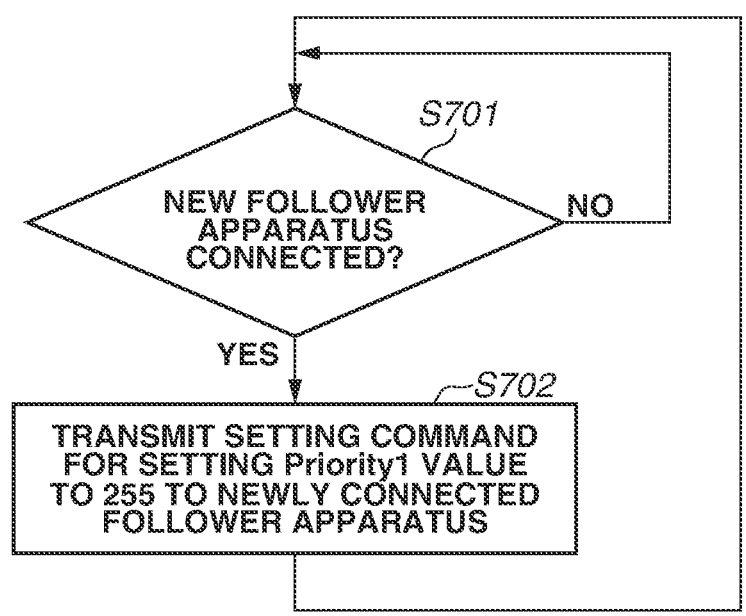
FIG. 7 illustrates an example of a flowchart of a process of transmitting a priority setting command executed by the communication apparatus operating as a leader apparatus.

The process in operation S607 will be described with reference to FIG. 7. FIG. 7 is a flowchart of the process of transmitting a priority setting command executed by the communication apparatus operating as the leader apparatus. In operation S701, a number-of-apparatus confirmation unit 308 determines whether a new follower apparatus (a communication apparatus operating as a follower apparatus) has been connected. If a follower apparatus has been newly connected (YES in operation S701), then in operation S702, a synchronization processing unit 306 transmits a setting command for setting the Priority1 value to 255 to the follower apparatus. The setting command can be transmitted using a "Reserved" field in the Announce message (FIG. 5), for example. Alternatively, the setting command may be transmitted using a "Reserved" field in a Management message (Management packet) in the PTP. FIG. 8 illustrates an example of a format of the Management message. Alternatively, the setting command may be transmitted using another communication protocol.

Returning to FIG. 6, in operation S603, a setting unit 307 sets the Priority1 value in the Announce message to be transmitted by a transmission unit 301 to 0. On the other hand, in operation S605, a reception unit 302 waits for the priority setting command from the leader apparatus in the wireless communication. Upon receipt of the priority setting command (YES in operation S605), then in operation S606, the setting unit 307 sets the Priority1 value in the Announce message to be transmitted by the transmission unit 301, in accordance with the received command. As described above, if the communication apparatus operates as a follower apparatus, the setting unit 307 sets the Priority1 value according to the command (value) issued by the leader apparatus. In operation S604 subsequent to operation S603 or S605, the synchronization processing unit 306 determines the PTP master in accordance with the BMCA.

In this manner, if the communication apparatus according to the present exemplary embodiment operates as a follower apparatus, the communication apparatus sets the Priority1 value in the Announce message to be transmitted, under the control of the leader apparatus. With the foregoing configuration, even if each of the plurality of communication apparatuses does not have a complicated configuration, the communication apparatuses operating as follower apparatuses are not set to be the PTP master, which makes it possible to prevent an increase in time synchronization error in the communication network.

The communication apparatuses according to the present exemplary embodiment sets (adjusts), depending on whether each of the communication apparatuses operates as a leader apparatus or a follower apparatus, the Priority1 value as a setting for operating as a PTP master or a PTP slave. Instead of this, another setting may be made. For example, the setting unit 307 may set the value of Priority2 in the Announce message (FIG. 5) (0 indicates top priority, and the default value is 128). Alternatively, the setting unit 307 may change the MAC address of the communication apparatus (the communication apparatus with a smaller address is more prioritized).

In the above-described exemplary embodiments, the plurality of communication apparatuses is configured to perform a time synchronization process in accordance with the PTP. Alternatively, the plurality of communication apparatuses may be configured to perform a time synchronization process in accordance with Network Time Protocol (NTP). That is, depending on whether each of the communication apparatuses operates as a leader apparatus or a follower apparatus, each of the communication apparatuses may be set to operate as an apparatus that provides the time in accordance with the NTP or an apparatus that is provided with the time in accordance with the NTP.

As described above, according to the exemplary embodiments of the disclosure, it is possible to prevent an increase in time synchronization error without complicating the configuration of nodes.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-079249, filed May 13, 2022, which is hereby incorporated by reference herein in its entirety.

What is claimed is:

1. A communication apparatus comprising:
at least one memory that stores a set of instructions; and
at least one processor that executes the instructions, the instructions, when executed, causing the communication apparatus to perform operations comprising:
performing a determination process to determine whether the communication apparatus operates as a leader apparatus in communication or operates as a follower apparatus in the communication;
performing a setting process, based on a result of the determination process, to set the communication apparatus to be a time master apparatus that is a provider of a reference clock for implementing time synchronization with one or more other communication apparatuses or to be a time slave apparatus that adjusts time in accordance with the reference clock, wherein the setting process to set the communication apparatus to be the time master apparatus is executed upon condition that the communication apparatus operates as the leader apparatus and the setting process to set the communication apparatus to be the time master apparatus is a process of setting a Priority1 value in an Announce message to be transmitted to a highest-priority value, and wherein the setting process to set the communication apparatus to be the time slave apparatus is executed upon condition that the communication apparatus operates as the follower apparatus and the setting process to set the communication apparatus to be the time slave apparatus is a process of setting the Priority1 value to a lowest-priority value such that the communication apparatus is the time slave apparatus; and performing a time synchronization process in accordance with Precision Time Protocol (PTP).

2. The communication apparatus according to claim 1, wherein the highest-priority value is 0.

3. The communication apparatus according to claim 1, wherein the lowest-priority value is 255.

4. The communication apparatus according to claim 1, wherein the operations further comprise transmitting, upon condition that the communication apparatus operates as the leader apparatus, a command to set the Priority1 value to a lowest-priority value, to the one or more other communication apparatuses.

5. The communication apparatus according to claim 4, wherein upon condition that the communication apparatus operates as the follower apparatus and the command is received from outside, the Priority1 value is set to the lowest-priority value.

6. The communication apparatus according to claim 1, wherein the operations further comprise detecting whether the communication apparatus is operating in an operation mode in which the communication apparatus performs a predetermined process in a state the communication apparatus is synchronized with the one or more other communication apparatuses, wherein in a case where it is detected that that the communication apparatus is operating in the operation mode, the setting process is performed.

7. The communication apparatus according to claim 6, wherein the predetermined process is an image capturing process.

8. The communication apparatus according to claim 1, wherein upon condition that a network including the communication apparatus and the one or more other communication apparatuses is formed by three or more communication apparatuses, the setting process is performed.

9. The communication apparatus according to claim 1, wherein upon condition that a network including the communication apparatus and the one or more other communication apparatuses is established, the setting process is performed.

10. The communication apparatus according to claim 1, wherein upon condition that another communication apparatus newly participates in a network including the communication apparatus and the one or more other communication apparatuses, the setting process is performed.

11. A method for controlling a communication apparatus, comprising:

performing a determination process to determine whether the communication apparatus operates as a leader apparatus in communication or operates as a follower apparatus in the communication; and performing a setting process to set, based on a result of the determination process, the communication apparatus to be a time master apparatus that is a provider of a reference clock for implementing time synchronization with one or more other communication apparatuses or to be a time slave apparatus that adjusts time in accordance with the reference clock, wherein the setting process to set the communication apparatus to be the time master apparatus is executed upon condition that the communication apparatus operates as the leader apparatus and the setting process to set the communication apparatus to be the time master apparatus is a process of setting a Priority1 value in an Announce message to be transmitted to a highest-priority value, and wherein the setting process to set the communication apparatus to be the time slave apparatus is executed upon condition that the communication apparatus operates as the follower apparatus and the setting process to set the communication apparatus to be the time slave apparatus is a process of setting the Priority1 value to a lowest-priority value such that the communication apparatus is the time slave apparatus; and performing a time synchronization process in accordance with Precision Time Protocol (PTP).

12. A non-transitory computer-readable storage medium storing a program for causing a computer to execute a method for controlling a communication apparatus, the method comprising:

performing a determination process to determine whether the communication apparatus operates as a leader apparatus in communication or operates as a follower apparatus in the communication;

performing a setting process to set, based on a result of the determination process, the communication apparatus to be a time master apparatus that is a provider of a reference clock for implementing time synchronization with one or more other communication apparatuses or to be a time slave apparatus that adjusts time in accordance with the reference clock, wherein the setting process to set the communication apparatus to be the time master apparatus is executed upon condition that the communication apparatus operates as the leader apparatus and the setting process to set the communication apparatus to be the time master apparatus is a process of setting a Priority1 value in an Announce message to be transmitted to a highest-priority value, and wherein the setting process to set the communication apparatus to be the time slave apparatus is executed upon condition that the communication apparatus operates as the follower apparatus and the setting process to set the communication apparatus to be the time slave apparatus is a process of setting the Priority1 value to a lowest-priority value such that the communication apparatus is the time slave apparatus; and performing a time synchronization process in accordance with Precision Time Protocol (PTP).

* * * * *